(12) United States Patent
Matsumura (10) Patent No.: US 10,061,522 B2
(45) Date of Patent: Aug. 28, 2018

(54) STORAGE CONTROLLING SYSTEM AND STORAGE CONTROLLING APPARATUS

(71) Applicants: BIOS Corporation, Tokyo (JP); MELCO HOLDINGS INC., Nagoya-shi (JP)

(72) Inventor: Seimei Matsumura, Tokyo (JP)

(73) Assignees: BIOS Corporation, Tokyo (JP); MELCO HOLDINGS INC., Nagoya-shi (JP)

( * ) Notice: Subject to any disclaimer, the term of this patent is extended or adjusted under 35 U.S.C. 154(b) by 72 days.

(21) Appl. No.: 14/757,505

(22) Filed: Dec. 23, 2015

(65) Prior Publication Data

US 2016/0188225 A1 Jun. 30, 2016

(30) Foreign Application Priority Data

Dec. 25, 2014 (JP) ................................ 2014-263021

(51) Int. Cl.
*G06F 12/00* (2006.01)
*G06F 3/06* (2006.01)
(Continued)

(52) U.S. Cl.
CPC .......... *G06F 3/0613* (2013.01); *G06F 3/0629* (2013.01); *G06F 3/0638* (2013.01);
(Continued)

(58) Field of Classification Search
CPC .... G06F 3/0613; G06F 3/0629; G06F 3/0638; G06F 3/0689; G06F 12/0893
See application file for complete search history.

(56) References Cited

U.S. PATENT DOCUMENTS 5,249,282 A * 9/1993 Segers ................ G06F 12/0897
711/122
6,021,517 A 2/2000 Yamamoto et al.
(Continued)

FOREIGN PATENT DOCUMENTS

JP H04-245352 A 9/1992
JP 10-254645 9/1998
(Continued)

OTHER PUBLICATIONS

Office Action issued in Japanese Patent Application No. 2014-263021 dated Apr. 16, 2013 with English Translation.

*Primary Examiner* — Prasith Thammavong
(74) *Attorney, Agent, or Firm* — Oblon, McClelland, Maier & Neustadt, L.L.P.

(57) ABSTRACT

A storage controlling system, coupled to a storage apparatus including storage disk devices, receives writing target data, generates a parity in units of parity generation of a given length for the data, and stores the data and parity into the devices. The system includes a cache memory and controller. The controller includes: a reception section receiving a writing instruction including the writing target data and information for specifying a target sector to write the data to; a decision section deciding whether processing target data is held in the cache memory, the processing target data including at least one unit of parity generation that includes sector data stored in the sector and fraction data other than the sector data; and a writing processing section updating, when the processing target data is in the cache memory, the data based on the instruction and outputting the post-update data as the writing target data to the apparatus.

13 Claims, 7 Drawing Sheets

(51) Int. Cl.
*G06F 12/0871* (2016.01)
*G06F 11/10* (2006.01)

(52) U.S. Cl.
CPC ........ *G06F 3/0689* (2013.01); *G06F 11/1076* (2013.01); *G06F 12/0871* (2013.01); *G06F 2212/1021* (2013.01); *G06F 2212/312* (2013.01); *G06F 2212/462* (2013.01)

(56) References Cited

U.S. PATENT DOCUMENTS

| | | | | |
|---|---|---|---|---|
| 6,226,722 B1* | 5/2001 | Shippy | ................ | G06F 12/0884 711/168 |
| 2004/0210794 A1* | 10/2004 | Frey | .................... | G06F 11/1076 714/5.1 |
| 2005/0223269 A1* | 10/2005 | Stolowitz | .............. | G06F 3/0617 714/6.12 |
| 2006/0206661 A1* | 9/2006 | Gaither | ................. | G06F 11/108 711/114 |
| 2007/0011590 A1* | 1/2007 | Chen | ................. | H03M 13/2903 714/784 |
| 2008/0256303 A1* | 10/2008 | Croxford | ............ | G06F 12/0886 711/144 |
| 2011/0082967 A1* | 4/2011 | Deshkar | ............... | G06F 12/0246 711/103 |
| 2012/0117428 A1* | 5/2012 | Fukuda | ............... | G06F 11/1064 714/54 |
| 2012/0137063 A1 | 5/2012 | Horibe et al. | | |
| 2012/0233406 A1* | 9/2012 | Igashira | .............. | G06F 12/0804 711/118 |
| 2014/0068397 A1* | 3/2014 | Feldman | ............ | G06F 11/1012 714/800 |
| 2015/0149819 A1* | 5/2015 | Lee | ..................... | G06F 11/1076 714/6.24 |

FOREIGN PATENT DOCUMENTS

| | | |
|---|---|---|
| JP | 2003-196032 A | 7/2003 |
| JP | 2012-078939 A | 4/2012 |
| JP | 2012-113789 | 6/2012 |
| WO | WO 2013/108097 A1 | 7/2013 |

* cited by examiner

STORAGE CONTROLLING SYSTEM AND STORAGE CONTROLLING APPARATUS

CROSS-REFERENCE TO RELATED APPLICATIONS

This application claims priority to Japanese Patent Application No. 2014-263021 filed on Dec. 25, 2014, the entire contents of which are incorporated by reference herein.

BACKGROUND

Technical Field

The present disclosure relates to a storage controlling system and a storage controlling apparatus coupled with a storage apparatus including a plurality of storage disk devices.

Background Arts

Japanese Patent Laid-Open No. Hei 10-254645 discloses a technology for setting the data length and redundant data length stored into a storage apparatus to be a multiple of a generation unit length (Error Check and Correct [ECC] generation unit length) of an ECC, and for postponing writing data to be written into the storage apparatus until the data has the set data length.

However, in the conventional technology described above, data stored actually in a storage apparatus and data to be written do not match, and therefore, there is a tendency that the use of the conventional technology is avoided in applications in which the stability of operation is required. There is also a technology called write-through in which writing into a storage apparatus and writing into a cache memory or the like are performed at the same time of writing data. In the case that the write-through technology is employed, whereas data stored actually in a storage apparatus and data to be written match, the data in the ECC generation unit described above has to be read out from the storage apparatus and processed at the time of writing, thus making a writing process time-consuming.

The present disclosure has been made in view of such a situation as described above, and it is an object of the present disclosure to provide a storage controlling system and a storage controlling apparatus by which increase of the speed of a writing process can be achieved also in write-through operation.

SUMMARY

According to the present disclosure, there is provided a storage controlling system coupled to a storage apparatus including a plurality of storage disk devices, wherein the storage apparatus receives writing target data, generates a parity in units of parity generation of a given data length for the writing target data, and stores the writing target data and the generated parity into the storage disk devices, the storage controlling system including a cache memory and a controller, and wherein the controller includes a reception section configured to receive a writing instruction including the writing target data and information for specifying a target sector that is a writing destination of the writing target data, a decision section configured to decide whether processing target data including, from within data including at least one unit of parity generation that includes sector data in the target sector determined as the writing destination by the received writing instruction and further includes fraction data other than the sector data, a portion other than the sector data is held in the cache memory, and a writing processing section configured to update, when it is decided as a result of the decision that the processing target data is held in the cache memory, the processing target data in the cache memory based on the writing instruction and output the processing target data, after its update, as the writing target data to the storage apparatus.

The above and other objects, features and advantages of the present disclosure will become apparent from the following description and the appended claims, taken in conjunction with the accompanying drawings in which like parts or elements are denoted by like reference characters.

EMBODIMENT

An embodiment of the present disclosure will now be described with reference to the drawings. A storage controlling system 1 according to the embodiment of the present disclosure includes a host apparatus 10, such as, for example, a personal computer (PC), and a storage controlling apparatus 30 as exemplified in FIG. 1. The storage controlling apparatus 30 is coupled with a storage apparatus 20.

Figure 1:
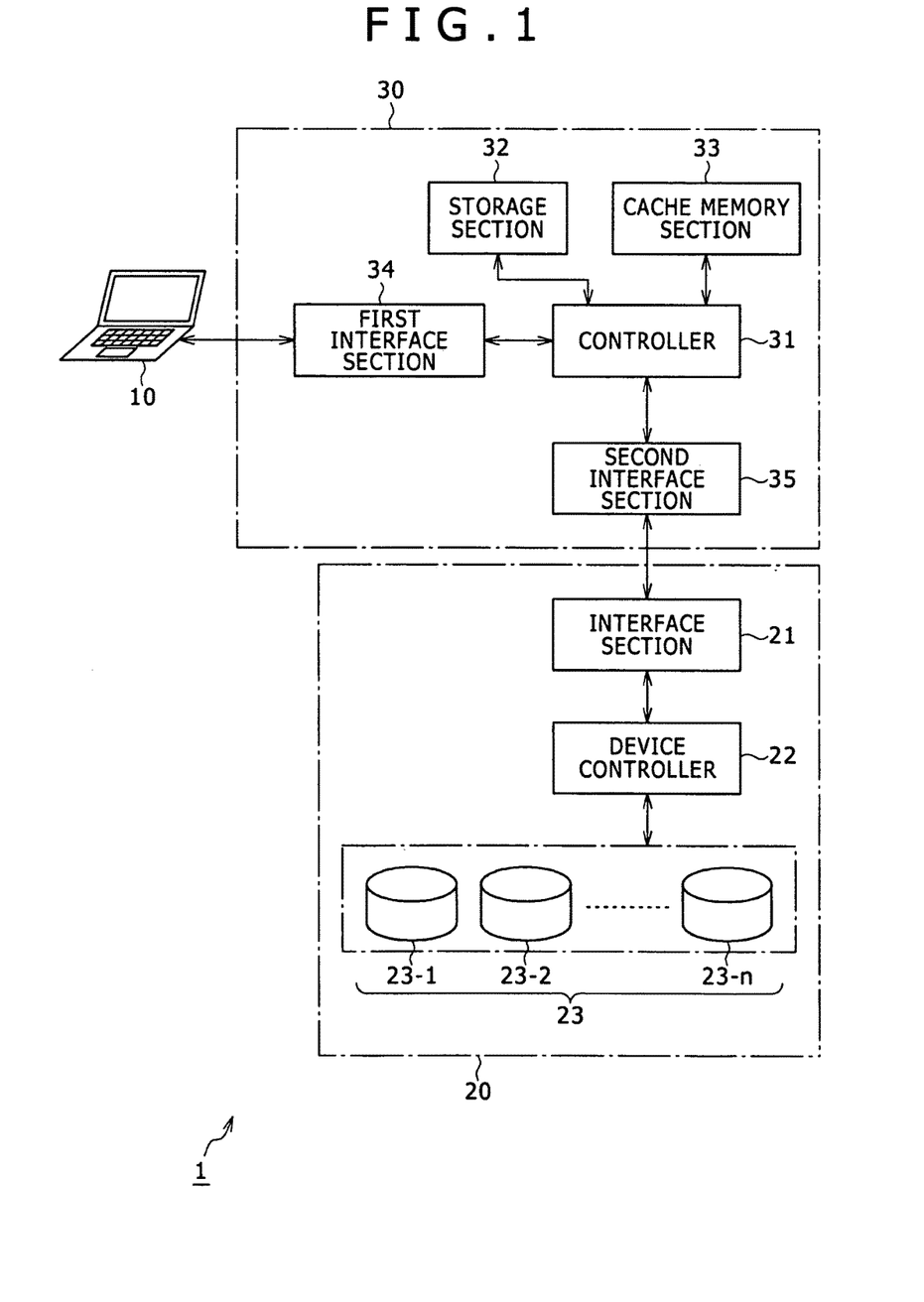
FIG. 1 is a block diagram depicting an example of a configuration of a storage controlling system according to an embodiment of the present disclosure.

The storage apparatus 20 includes an interface section 21, a device controller 22 and a plurality of storage disk devices 23-1, 23-2, etc. Here, each storage disk device 23 is a recording medium, which exhibits different speed between random access and sequential access, of a disk device such as a hard disk drive (HDD) or of an optical disk device such as Blu-Ray (registered trademark) disk drive. The storage controlling apparatus 30 includes a controller 31, a storage section 32, a cache memory section 33, a first interface section 34 and a second interface section 35.

The interface section 21 of the storage apparatus 20 is coupled with the storage controlling apparatus 30, receives writing target data or a command from the storage controlling apparatus 30 and outputs the received data or command to the device controller 22. Further, the interface section 21 receives data to be output from the device controller 22 and outputs the received data to the storage controlling apparatus 30.

The device controller 22 demarcates, when receiving data to be written into the storage disk device 23 (writing target data) and a command for writing through the interface section 21, the writing target data into units of parity generation each having a predetermined data length (referred to as parity generation data length) to generate parity data for each unit of parity generation and then records the writing target data and the generated parity data into the storage disk device 23.

Further, the device controller 22 reads out, when receiving a read command through the interface section 21, data to be read out from the storage disk device 23 side and outputs the read out data to the interface section 21.

In a certain example of the present embodiment, the device controller 22 functions as a Redundant Arrays of Inexpensive Disks (RAID) controller. In this example, a plurality of ("n" number of) storage disk devices 23 operate as a RAID array. While, in the following description of the present embodiment, the device controller 22 functions as the RAID controller, the present embodiment is not limited to a case in which the storage disk device 23 is configured as the RAID array. In particular, the device controller 22 may perform any control that makes data to write redundant, using information for redundancy of a parity, and records the data using the plurality of storage disk devices 23.

In one example of the present embodiment, at least three or more (n≥3) storage disk devices 23 are provided, and the device controller 22 demarcates and manages the storage disk devices 23-1 to 23-$n$ into storage regions (chunks) for each predetermined data length LC. Further, the device controller 22 in this example receives writing target data together with an instruction for writing and divides the writing target data for "each data length (segment length) of (n−p)×LC of the chunk described above," where (n−p) is obtained by subtracting the number p of parities from the number n of storage disk devices 23 thereby to obtain data segments A, B, etc. For simplification of the following description, it is assumed that p=1. In this case, the device controller 22 divides the writing target data for each data length of (n−1)×LC to obtain data segments A, B, etc.

In particular, in this example, the device controller 22 generates, using data segments each as a unit of parity generation, corresponding parity data Aparity, Bparity, etc. for individual data segments A, B, etc. of the data length of (n−1)×LC. The device controller 22 further selects the storage disk device 23 into which the parity data is stored for each data segment obtained as described above.

Figure 2:
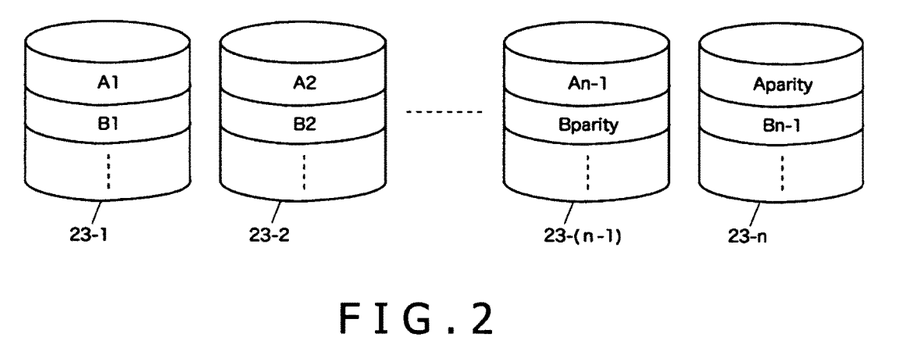
FIG. 2 is an explanatory view depicting an example where data is stored in a storage apparatus of the storage controlling system according to the embodiment of the present disclosure.

For example, the device controller 22 demarcates the data segments into chunks A1, A2 to An−1, and B1, B2 to Bn−1 individually having the length LC, and stores the parity data Aparity, corresponding to the data segment A, into the storage disk device 23-$n$. Further, the chunks A1 and A2 to An−1 obtained by demarcating the data segment A are successively stored into storage regions (whose positions are specified by information for specifying a logical sector included in a writing instruction) of the n−1 storage disk devices 23-1 to 23-(n−1) other than the storage disk device 23-$n$ selected as the storage destination of the parity data (FIG. 2).

The device controller 22 stores the parity data Bparity corresponding to the data segment B into the storage disk device 23-(n−1), and stores the data B1 and B2 to Bn−1 obtained by demarcating the data segment B into the respective storage disk devices 23-1 to 23-(n−2) and 23-$n$. Since such a storage method as just described is known as RAID 5, detailed description of this is omitted herein.

Figure 3:
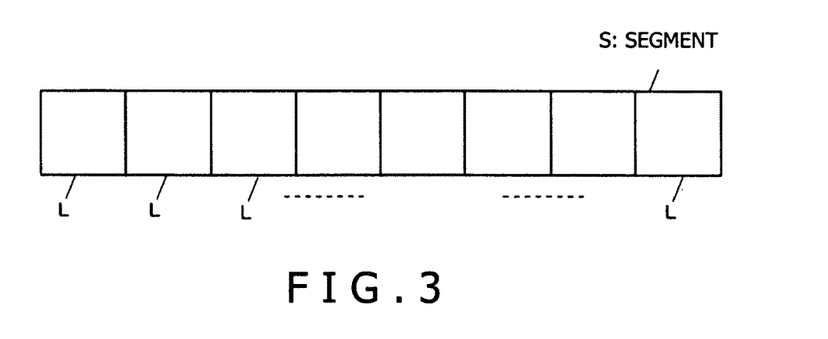
FIG. 3 is an explanatory view depicting an example of a logical sector and a segment in the storage controlling system according to the embodiment of the present disclosure.

As depicted in FIG. 3, a natural number of logical sectors (L) are included in regions (regions disposed divisionally in n−1 number of storage disk devices 23, and hereinafter referred to as segments) S in which the data segments A, B, etc. are stored. The device controller 22 associates information for specifying logical sectors included in the segment with each segment and stores resulting information as map information.

Further, the device controller 22 in this example of the present embodiment receives, as an instruction of reading, information for specifying a logical sector to be read. Then, the device controller 22 refers to the map information to specify a segment including a logical sector specified by the received information.

The device controller 22 reads out data and corresponding parity data in the specified segment from the storage disk devices 23-1 to 23-$n$. Here, the device controller 22 detects whether there is an error in the data in the segment using the parity data or corrects an error, if any, in the segment. Since such a process is the same as one of widely-known functions of the RAID, its detailed description is omitted herein.

Then, the device controller 22 outputs a data part in the logical sector specified by information included in the read command (outputs data of the entire segment if the data corresponds to the entire segment) from within the data read out from the storage disk device 23 to the storage controlling apparatus 30 through the interface section 21.

The controller 31 of the storage controlling apparatus 30 is a device for controlling programs, such as a central processing unit (CPU), and operates in accordance with a program stored in the storage section 32.

In particular, the controller 31 receives a writing instruction (write command) of data from the host apparatus 10. The writing instruction includes data to be written and information for specifying a logical sector into which the data should be stored. That is to say the length of data (data length) to be written by the writing instruction is equal to a natural number of times (however, zero is not included; this also applies to the following descriptions) of a sector unit (having a data length capable of being stored in one sector).

The controller 31 determines, as a target sector, a logical sector into which data is written by the writing instruction received here. Then, the controller 31 decides whether data (hereinafter referred to as processing target data) is held in the cache memory section 33, the data at least including a part other than data (hereinafter referred to as sector data) recorded in the target sector, from within data with a length longer than a natural number of times of a parity generation data length at least including one unit of parity generation having the sector data and fraction data. This is because it is sufficient to cache the data (including fraction data) of a part other than the sector data from within the data to be written since the present sector data is rewritten by the writing instruction, although the data included in the writing instruction (data that should be replaced with the present sector data) and data at the remaining part (so-called data at a fraction part, and hereinafter referred to as fraction data) are usually included in the units of parity generation. It is a matter of course that the sector data may be included in the processing target data. Further, there may be a case in which the entire unit of parity generation is the only data included in the writing instruction (a case in which the writing instruction includes no fraction data). In this case, the controller 31 outputs the data included in the writing instruction as the processing target data to the storage apparatus 20 without deciding whether the data is held in the cache memory section 33.

The controller 31, upon deciding that the processing target data is held in the cache memory section 33, rewrites or additionally writes a data part corresponding to the sector data described above into the processing target data in the cache memory section 33 based on the received write command so as to update the processing target data. Then, the controller 31 outputs the updated processing target data to the storage apparatus 20. Operation of the controller 31 of the present embodiment will hereinafter be described in detail.

The storage section 32 is, for example, a memory device for storing a program to be executed by the controller 31. The program stored in the storage section 32 may be provided in a state that it is stored in a computer-readable and non-transitory recording medium or may be acquired through a communication line such as a network. In the present embodiment, the storage section 32 operates also as a work memory for the controller 31.

The cache memory section 33 is a memory device that functions as a cache in the storage controlling apparatus 30. In one mode of the present embodiment, the cache memory section 33 may be implemented as part of the storage section 32. The first interface section 34 is coupled with the host apparatus 10 and transmits and receives data or a command to and from the controller 31 and the host apparatus 10. The second interface section 35 is coupled with the storage apparatus 20 and transmits and receives data or a command to and from the controller 31 and the storage apparatus 20.

Operation of Controller

The operation of the controller 31 will now be described. In the example of the present embodiment, the storage controlling apparatus 30 associates, with each segment of the storage apparatus 20, information for specifying a logical sector included in the segment and stores the information as map information. The map information is the same as that stored in the device controller 22. Further, since the operation when the controller 31 receives a reading instruction (read command) from the host apparatus 10 from among the operations of the controller 31 is similar to that in the conventional example, a detailed description of it is omitted herein.

Figure 4:
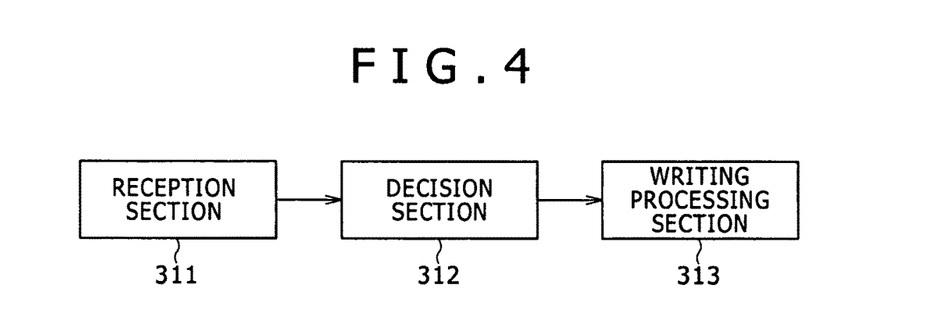
FIG. 4 is a functional block diagram depicting an example of a controller of a storage controlling apparatus of the storage controlling system according to the embodiment of the present disclosure.
Figure 5A:
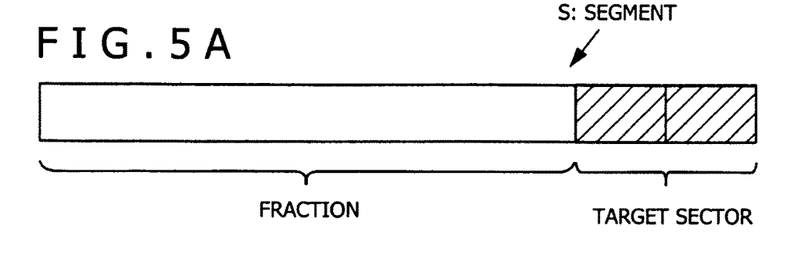
FIG. 5A is an explanatory view of operation when a fraction is generated only in the front in the storage controlling apparatus of the storage controlling system according to the embodiment of the present disclosure.
Figure 5B:
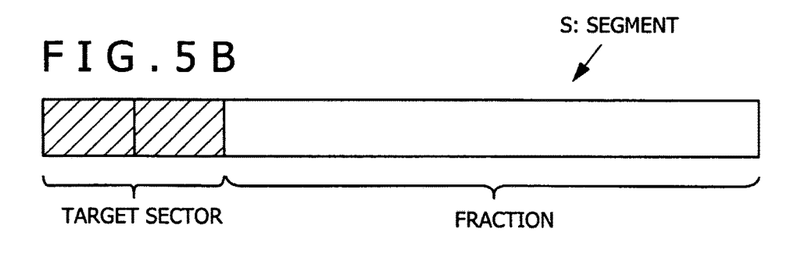
FIG. 5B is an explanatory view of operation of the storage controlling apparatus when a fraction is generated only in the rear in the storage controlling system according to the embodiment of the present disclosure.
Figure 5C:
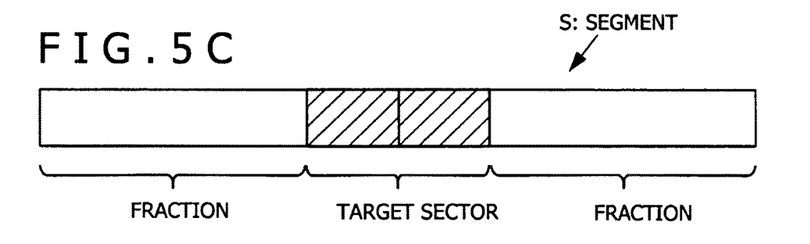
FIG. 5C is an explanatory view of operation of the storage controlling apparatus when a fraction is generated in both of the front and the rear in the storage controlling system according to the embodiment of the present disclosure.
Figure 5D:
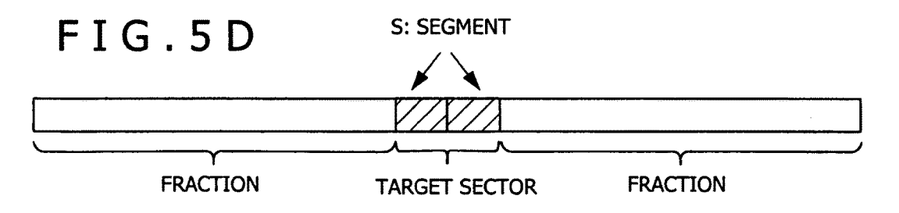
FIG. 5D is an explanatory view of operation of the storage controlling apparatus when a portion corresponding to a target sector spans a plurality of segments in the storage controlling system according to the embodiment of the present disclosure.

The controller 31, receiving a writing instruction (write command) of data from the host apparatus 10, executes the following fraction process. In particular, as exemplified in FIG. 4, the controller 31 of the present embodiment functionally includes a reception section 311, a decision section 312 and a writing processing section 313. The reception section 311 receives the data writing instruction (write command) from the host apparatus 10. As described hereinabove, the writing instruction that the reception section 311 receives from the host apparatus 10 includes data to be written and information for specifying a logical sector into which the data should be stored.

The decision section 312 decides whether data (processing target data) at least including a part other than sector data from within data having at least one unit of parity generation including sector data recorded in the target sector and fraction data is held in the cache memory section 33, the target sector serving as a logical sector specified by information included in the write command received by the reception section 311. In this example of the present embodiment, since the unit of parity generation is used as the unit of the segment, the decision section 312 decides whether data other than the target segment from within the data including a segment (where the target sector spans a plurality of segments, the entire segments) including the target sector is stored in the cache memory section 33.

When the decision section 312 decides that the processing target data is held in the cache memory section 33, the writing processing section 313 reads out the processing target data in the cache memory section 33 based on the received write command. If the data part corresponding to the sector data described above is included in the read out processing target data, then the writing processing section 313 rewrites the data part with the data included in the write command to update the processing target data. Further, if the data part corresponding to the sector data described above is not included in the read out processing target data, then the writing processing section 313 additionally writes the data included in the write command to (writes the part corresponding to the sector data from within) the read out processing target data to update the processing target data. Here, the part corresponding to the sector data can be decided based on information for designating a source position of reading out the processing target data in the cache memory section 33 (information for specifying the position of a sector). Then, the writing processing section 313 outputs the processing target data, after its update, as writing target data to the storage apparatus 20. Further, at this time, the writing processing section 313 additionally outputs information for specifying the logical sectors that are storage destinations of the processing target data, after its update, as information for designating the position to write the processing target data to. Further, at this time, the writing processing section 313 rewrites the processing target data stored in the cache memory section 33 with the processing target data after the update (cache by the write through method). The processing target data after the update to be output as a writing target here is, where a fraction is included, data including not only the data included in the write command but also the fraction; the processing target is data included in the write command if a fraction is not included.

On the other hand, if the decision section 312 decides that the processing target data is not held in the cache memory section 33 (this applies to a case where it is decided that, while part of the processing target data is held, the entire processing target data is not held in the cache memory section 33), the writing processing section 313 acquires at least part of the processing target data from the storage apparatus 20 so that the processing target data is held in the cache memory section 33.

In particular, when the decision section 312 decides that the processing target data is not held in the cache memory section 33, the writing processing section 313 starts reading data by one of the methods described below. In a certain example of the present embodiment, a plurality of logical sectors (L) are included in a segment in the storage apparatus 20 as depicted in FIGS. 5A to 5D. Accordingly, in a segment (S) that is a unit of reading and writing of data in the storage apparatus 20, data that is not a target of writing (i.e., fraction data) is also normally included in the front and the rear of the logical sector (L) that stores sector data to be written by the write command. The writing processing section 313 consequently reads (at least a lacking portion of) the processing target data by one of (1) a method for reading out minimum required data and (2) another method for reading out data exceeding the minimum required amount. These methods will be described below.

(1) Method of Reading Out Minimum Required Data

When this method is adopted, the controller 31 that operates as the writing processing section 313 refers to map information to specify a segment that includes a logical sector (target sector) to be rewritten by a write command and checks whether a fraction is included in the front and the rear of the target sector in the specified segment.

Then, (1-1) if a fraction is included only in the front of the target sector (FIG. 5A), then the controller 31 that operates as the writing processing section 313 outputs a reading instruction including information for specifying a logical sector corresponding to the fraction part in the front of the target sector (the fraction part may not include the target sector) to the storage apparatus 20. It is to be noted that, when the portion corresponding to the target sector spans a plurality of segments, the controller 31 also outputs a reading instruction including information for specifying a logical sector corresponding to the fraction part in the front of the target sector (the fraction part may not include the target sector) to the storage apparatus 20.

Moreover, (1-2) if a fraction is included only in the rear of the target sector (FIG. 5B), then the controller 31 that operates as the writing processing section 313 outputs a reading instruction including information for specifying a logical sector corresponding to the fraction part in the rear of the target sector (the fraction part may not include the target sector) to the storage apparatus 20. It is to be noted that, when the portion corresponding to the target sector spans a plurality of segments, the controller 31 also outputs a reading instruction including information for specifying a logical sector corresponding to the fraction part in the rear of the target sector (the fraction part may not include the target sector) to the storage apparatus 20.

(1-3) If a fraction is included in both of the front and the rear of the target sector (FIG. 5C), then the controller 31 that operates as the writing processing section 313 outputs a reading instruction including information for specifying a logical sector corresponding to the fraction part in the front of the target sector and another logical sector corresponding to the fraction part in the rear of the target sector (the fraction parts may not include the target sector) to the storage apparatus 20. It is to be noted that, when the portion corresponding to the target sector spans a plurality of segments (FIG. 5D), the controller 31 also outputs a reading instruction including information for specifying logical sectors corresponding to the fraction part in the front and the fraction part in the rear of the target sector (the fraction parts may not include the target sector) to the storage apparatus 20. It is to be noted that, in regard to the reading instruction in this case, it is sometimes more efficient to read out the data including the fraction part in the front, the fraction part in the rear, and the target sector than to read out the fraction part in the front and the fraction part in the rear separately by two reading operations. Accordingly, the reading instruction in this case may be controlled so as to include the target sector.

It is to be noted that, if a fraction is included in both of the front and the rear of data of the target sector in this manner, then the controller 31 that operates as the writing processing section 313 may check the size of the data to be read out in accordance with the rule described above. In this case, if it is decided that the size exceeds predetermined size (for example, approximately several times larger than the segment size), then the controller 31 may output the data to be written by the write command to the storage apparatus 20 without reading the data (without performing the fraction process in the present embodiment).

(2) Method of Reading Out Data Exceeding Minimum Required Amount

When this method is adopted, the writing processing section 313 refers to the map information to specify a segment including the target sector to be rewritten by the write command. Then, the controller 31 that operates as the writing processing section 313 may output to the storage apparatus 20 a reading instruction including the specified segment and information for specifying all the logical sectors (the target sector may be excluded) included in a predetermined number of segments following the specified segment. It is to be noted that, if a fraction part is included in the front and the rear of the target sector in the specified segment, it is sometimes more efficient to read out the data including the fraction part in the front, the fraction part in the rear, and the target sector than to read out the fraction part in the front and the fraction part in the rear separately by two reading operations. Accordingly, at this time, the reading instruction may be controlled so as to include the target sector.

Further, if the data in the logical sectors included in the predetermined number of segments following the specified segment is stored in the cache memory section 33, the writing processing section 313 may read out the data from the cache memory section 33 in place of outputting an instruction for reading out the data to the storage apparatus 20.

It is to be noted that, when the target sector spans a plurality of segments, the writing processing section 313 also outputs, to the storage apparatus 20, a reading instruction that includes information for specifying all the logical sectors (the target sector may be excluded) in a plurality of segments including the target sector and information for specifying all the logical sectors (the target sector may be excluded) included in the predetermined number of segments following the segments. It is to be noted that, where a fraction part is included in the front and the rear of the target sector, it is sometimes more efficient to read out the data including the fraction part in the front, the fraction part in the rear, and the target sector than to read out the fraction part in the front and the fraction part in the rear separately by two reading operations. Accordingly, at this time, the reading instruction may be controlled so as to include the target sector.

Further, where the data in the logical sectors included in the predetermined number of segments following the specified segment is stored in the cache memory section 33, the writing control section 313 may read out the data from the cache memory section 33 in place of outputting an instruction for reading out the data to the storage apparatus 20.

Here, the predetermined number mentioned above is determined experimentally by measuring the processing rate while the number is actually changed successively. This is because it is considered that an optimum value of the number may be affected by the seek speed and the hit rate of the storage disk devices.

The writing processing section 313 receives data output from the storage apparatus 20 in response to such a reading instruction as described above. In the example of the present embodiment, since such control as described above is performed, data at least of fractions in the front and the rear of the target sector (or data of a plurality of segments following the target sector) to be rewritten is obtained from the storage apparatus 20. Further, where the data includes a reading instruction of the target section to be rewritten, the sector data is also obtained from the storage apparatus 20.

The writing processing section 313 stores the data obtained from the storage apparatus 20 and information that specifies a logical sector corresponding to the data in an associated manner, into the cache memory section 33 as processing target data (cache operation). Here, the information for specifying the logical sector corresponding to the data may be information for specifying the logical sector at the top of the information (requested sector information) that specifies the logical sector sent out to the storage apparatus 20 and is included in the reading instruction.

If the processing target data stored in the cache memory section 33 includes a data part corresponding to the target sector, then the writing processing section 313 rewrites the data part with the data included in the write command to update the processing target data. If the processing target data stored in the cache memory section 33 does not include the data part corresponding to the target sector, then the writing processing section 313 additionally writes the data part corresponding to the target sector to the processing target data to thus update the processing target data.

Thereafter, the writing processing section 313 outputs the updated processing target data as the writing target data to the storage apparatus 20. It is to be noted that, at this time, the writing processing section 313 may output the entire updated processing target data as writing target data to the storage apparatus 20. Alternatively, the writing processing section 313 may extract, from within the updated processing target data, a portion including data of a unit of parity generation that includes the portion that has been rewritten with the data included in the write command or to which the data included in the write command is additionally written, and output the extracted portion as writing target data to the storage apparatus 20. At this time, the writing processing section 313 additionally outputs information for specifying the logical sectors into which data included in the writing target data is written as information for designating the position of the writing destination. Further, at this time, the writing processing section 313 rewrites the processing target data stored in the cache memory section 33 with the updated processing target data.

It has been described that the writing processing section 313 in the example described above operates such that the writing processing section 313 acquires the entire processing target data from the storage apparatus 20, even if part of the processing target data is held in the cache memory section 33 (in the case where, although the entire processing target data is not held, part of the processing target data is held). The writing processing section 313 may however output to the storage apparatus 20 a reading instruction including information for specifying a logical sector representative of the part of the processing target data that is not held in the cache memory section 33.

Also in this case, the writing processing section 313 reads out part of the processing target data stored in the cache memory section 33, connects the thus read-out data to the data read out from the storage apparatus 20, and stores resulting data into the cache memory section 33 newly. Consequently, the processing target data is held in the cache memory section 33. If the processing target data stored in the cache memory section 33 includes the data part corresponding to the target sector, then the writing processing section 313 rewrites the data part with the data included in the write command to update the processing target data. However, if the processing target data stored in the cache memory section 33 does not include the data part corresponding to the target sector, then the writing processing section 313 additionally writes the data corresponding to the target sector to the processing target data to update the processing target data. The writing processing section 313 outputs to the storage apparatus 20 the processing target data, after its update, as writing target data. At this time, the writing processing section 313 additionally outputs information for specifying the logical sectors into which the processing target data after the update should be stored as information for specifying the position of the writing destination. Further, at this time, the writing processing section 313 rewrites the processing target data stored in the cache memory section 33 with the processing target data after the update.

Operation

The storage controlling system 1 of the present embodiment is configured in such a manner as described above and operates in the following manner. As exemplified in FIG. 6, when the storage controlling apparatus 30 receives a writing instruction (write command) of data from the host apparatus 10 (S11), the storage controlling apparatus 30 decides whether data (processing target data) including at least a portion other than the sector data is cached (S12), from among data having at least one unit of parity generation that includes sector data and fraction data recorded in a target section that is a logical sector specified by information included in the received write command.

Figure 6:
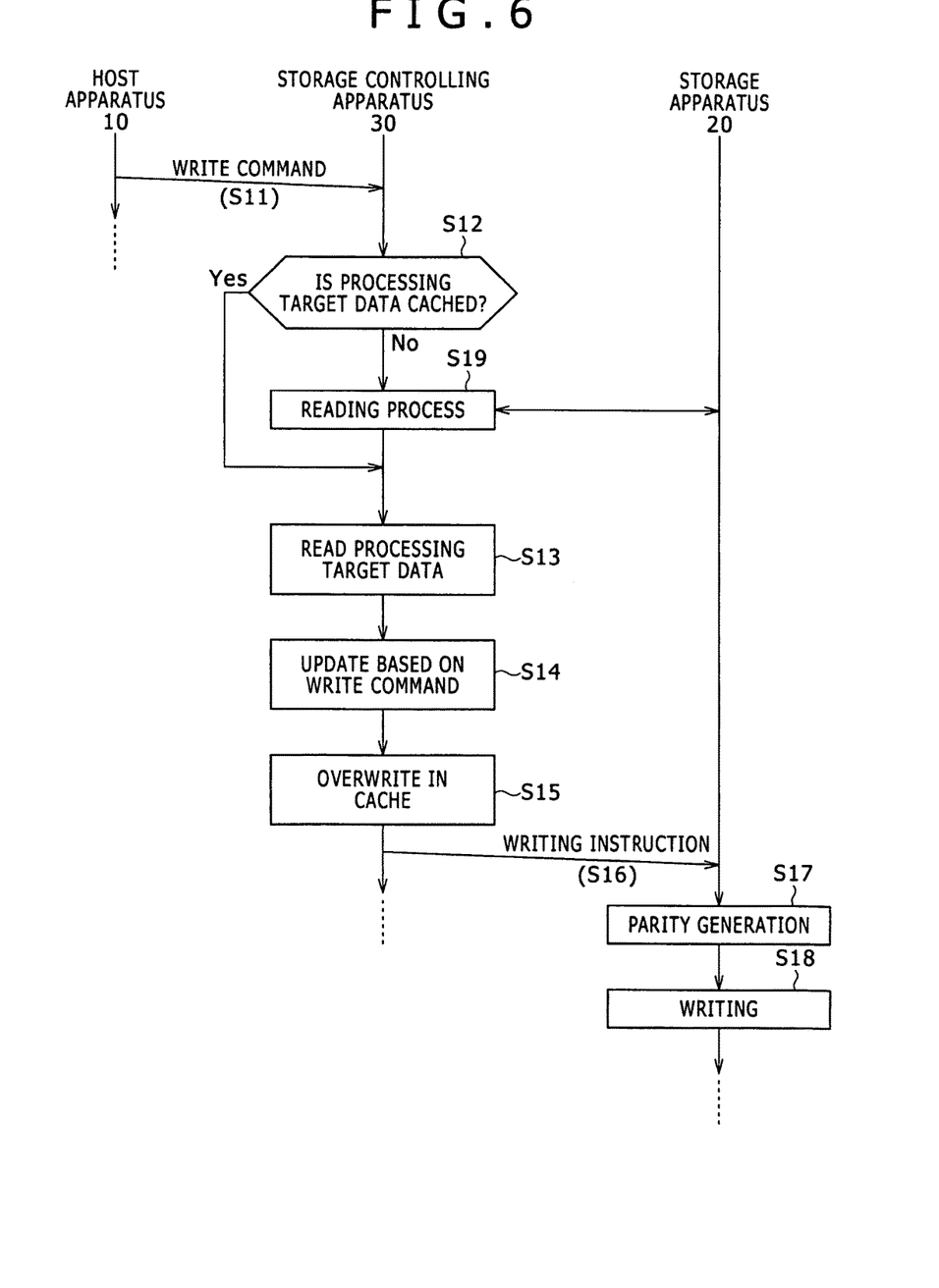
FIG. 6 is a flowchart illustrating an example of operation upon data reading of the storage controlling system according to the embodiment of the present disclosure.

Here, if it is decided that the processing target data is cached (Yes), then the storage controlling apparatus 30 reads out the cached processing target data (S13). Then, if the read out processing target data includes sector data of the target sector, the storage controlling apparatus 30 rewrites the data part corresponding to the sector data with the data included in the write command to update the processing target data (S14). It is to be noted here that, if the read out processing target data does not include sector data of the target sector, then the storage controlling apparatus 30 additionally writes the data included in the write command to the data part corresponding to the sector data to update the processing target data (S14).

Then, the storage controlling apparatus 30 overwrites the updated processing target data into the cache (S15). Then, the storage controlling apparatus 30 outputs to the storage apparatus 20 the processing target data, after its update, as writing target data (S16). At this time, the storage controlling apparatus 30 additionally outputs information for specifying individual corresponding logical sectors included in the processing target data as information for specifying the writing destination.

The storage apparatus 20 receives the writing target data. The writing target data received here includes the sector data whose writing instruction has been issued from the host apparatus 10 and further includes at least one unit of parity generation. The storage apparatus 20 thus demarcates the writing target data into units of parity generation (if only one unit of parity generation is included in the writing target data, then the one generation unit may be left as it is) and generates parity data (S17). In the present embodiment, since the data of the writing target output to the storage apparatus 20 is generated in units of parity generation in this manner, the storage apparatus 20 need not read out the other portions than the sector data from a storage disk device, such as a hard disk drive, in order to generate parity data.

The storage apparatus 20 successively stores the writing target data, which have been demarcated into chunk units, and the generated parity data into the storage region of the storage disk device (the position in the storage region is a region corresponding to the logical sector specified by the information received together with the writing target data) (S18). Since the method for storage in S18 may be a method widely known as a RAID process or a like method, the detailed description of the method is omitted herein.

On the other hand, if it is decided in process S12 that the processing target data is not cashed (No), then the storage controlling apparatus 30 outputs to the storage apparatus 20 a reading instruction including information for specifying all the logical sectors (but the target sector may not be included) within the range of the storage apparatus 20 within which the processing target data is stored (S19: reading process).

Figure 7:
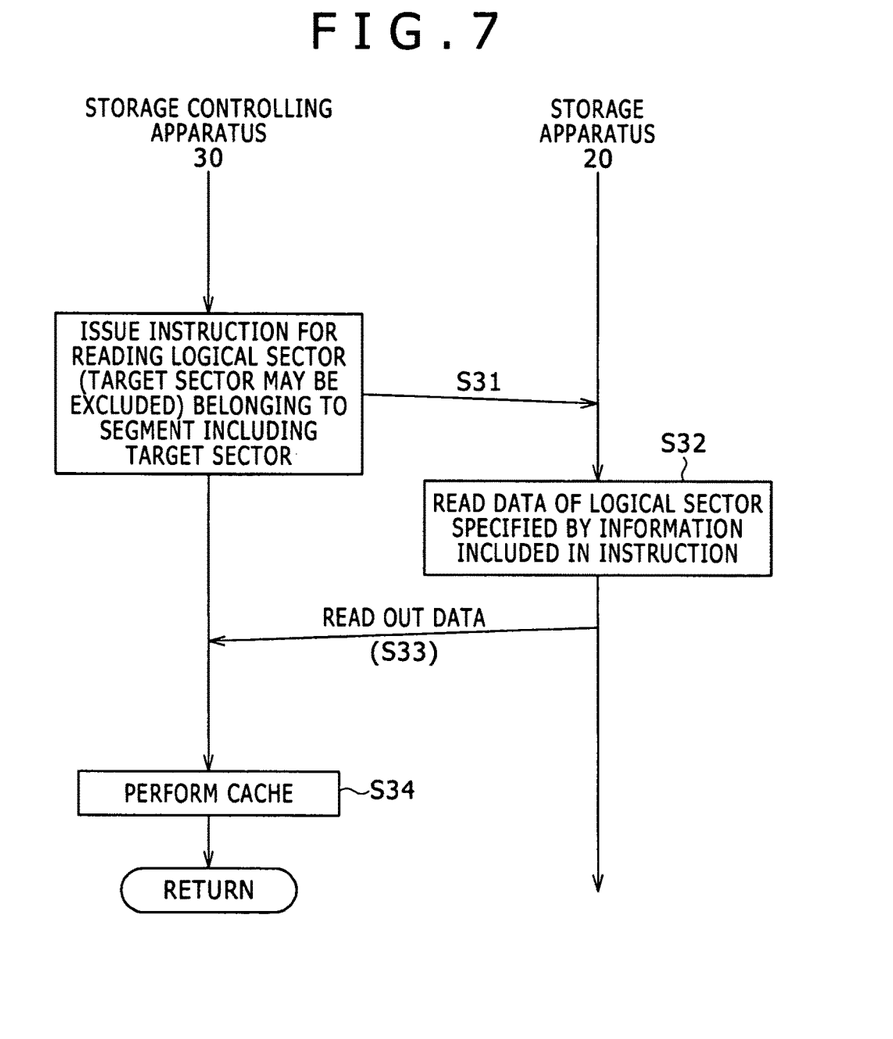
FIG. 7 is a flowchart illustrating an example of operation upon data writing of the storage controlling system according to the embodiment of the present disclosure.

As an example of the present embodiment, in the reading process in process S19, the storage controlling apparatus 30 extracts the information for specifying the target sector included in the received write command as exemplified in FIG. 7. Then, the storage controlling apparatus 30 specifies the segment of the storage apparatus 20 including the storage sector specified by the extracted information (for example, the storage controlling apparatus 30 finds out, from within the map information, the information for specifying the top logical sector from among the logical sectors belonging to the same segment as that of the target sector). Then, the storage controlling apparatus 30 outputs a reading instruction including the information for specifying all the logical sectors (but the target sector may not be included) belonging to the specified segment to the storage apparatus 20 (S31).

The storage apparatus 20 receives the reading instruction from the storage controlling apparatus 30 and reads data of the logical sectors specified by the information included in the reading instruction (the logical sectors corresponding to a portion of the entire segment which includes at least all the logical sectors except the target sector) from the cache memory section 33 (S32) and then outputs the read out data to the storage controlling apparatus 30 (S33).

The storage controlling apparatus 30 receives and caches the data output from the storage apparatus 20 in response to the reading instruction (S34). Here, the storage controlling apparatus 30 acquires the data in the logical sector (the target sector may be excluded) from within the segment that includes the sector data in the target sector to be rewritten by the write command from the storage apparatus 20 and caches the acquired data.

That is, at least data except the sector data of the target sector is cached at the step of the reading process in the present embodiment, from among data that includes at least one unit of parity generation (this corresponds, in this example, to a segment unit) including sector data in a target sector to which a writing instruction has been issued.

Then, the storage controlling apparatus 30 returns to the processing exemplified in FIG. 6 and advances to process S13 to continue the processing.

In this manner, in the example of the present embodiment, if processing target data has not already been cached, at least part of the processing target data (which may be the entire processing target data or data only in a lacking portion, and the data part to be rewritten in accordance with the writing instruction may be excluded) is acquired from the storage apparatus 20 so that the processing target data is in a cached state. Consequently, the storage controlling apparatus 30 can output data which includes at least one unit of parity generation and in which data in the write command is included in the at least one unit of parity generation. Since the writing target data is configured from the units of parity generation in this manner, the storage apparatus 20 itself need not read out a portion other than sector data from a storage disk device, such as a hard disk drive, in order to generate parity data.

Example of the Storage Controlling System Including Cache Device

In the storage controlling system of the present embodiment, the storage controlling apparatus 30 may further include a cache device that caches data stored in the storage apparatus 20 but is different from the cache memory section 33.

Figure 8:
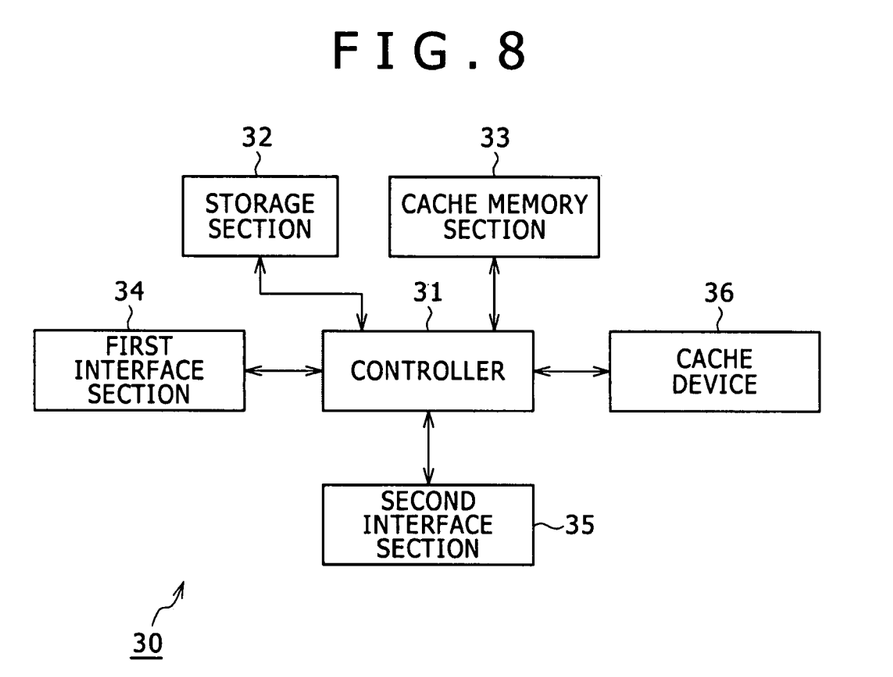
FIG. 8 is a block diagram depicting another example of a configuration of the storage controlling apparatus of the storage controlling system according to the embodiment of the present disclosure.

The storage controlling apparatus 30 in the present example includes a cache device 36 in addition to the controller 31, storage section 32, cache memory section 33, first interface section 34 and second interface section 35 as exemplified in FIG. 8.

The cache device 36 is implemented by a storage device such as a solid state drive (SSD) that typically reads and writes data more quickly than the storage apparatus 20. Reading out and writing data from and into the cache device 36 are performed in units of predetermined data length. The units of the predetermined data length for the cache device 36 are hereinafter referred to as a cache segment, and the data length of the cache segment is referred to as cache segment length.

The controller 31 of the storage controlling apparatus 30 virtually divides the entire data storage region of the storage apparatus 20 (entire logical sectors that can be designated) into blocks of the cache segment length. The controller 31 subsequently stores into the storage section 32 in advance, for each of the blocks of the cache segment length obtained by the division, a list of pieces of information for specifying, for example, the logical sector corresponding to the top of the block as information for specifying the block.

Also in this example of the present embodiment, the controller 31 of the storage controlling apparatus 30 has a functional configuration similar to that exemplified in FIGS. 5A to 5D, but is slightly different in operations of the decision section 312 and the writing processing section 313. In the following, the operation of the decision section 312 and the writing processing section 313 will be described.

The decision section 312 in the present example determines a logical sector specified by information included in a write command received by the reception section 311 as a target sector. The decision section 312 further decides whether data (processing target data) is held in the cache memory section 33, the data including at least a portion of the data except the sector data, from among data having at least one unit of parity generation that includes sector data and fraction data recorded in the target sector. Then, if the processing target data is held in the storage section 32, the decision section 312 outputs the result of the decision to the writing processing section 313. Where a unit of parity generation is used as a unit of a segment, the decision section 312 decides whether a segment including the target sector (if the target sector spans a plurality of segments, the entire plurality of segments) (the data may not include the sector data in the target sector) is stored in the cache memory section 33.

The decision section 312 checks also whether the processing target data is held in the cache device 36. If the processing target data is held in the cache device 36, then the decision section 312 outputs information representative of the result of the decision to the writing processing section 313. Where a unit of parity generation is used as a unit of a segment, the decision section 312 decides whether data having a segment that includes the target sector (if the target sector spans a plurality of segments, the entire plurality of segments) (the sector data in the target sector may be excluded) is stored in the cache device 36. Here, since the data length of a segment used in the storage apparatus 20 and the cache segment length are not necessarily the same, even if the data stored in the cache device 36 includes not only the entire segment having the target sector (the sector data in the target sector may be excluded) but also surplus data, the decision section 312 decides that the processing target data is cached.

Further, if the processing target data is held neither in the cache memory section 33 nor in the cache device 36, then the decision section 312 outputs information representative of the result of the decision to the writing processing section 313.

The writing processing section 313 performs, when the decision section 312 decides that processing target data is held in the cache memory section 33, operation similar to that described hereinabove. On the other hand, if the decision section 312 decides that, although processing target data is not held in the cache memory section 33, processing target data is held in the cache device 36, then the writing processing section 313 copies the processing target data held in the cache device 36 into the cache memory section 33. Then, the writing processing section 313 performs the operation similar to that when it is decided that processing target data is held in the cache memory section 33.

On the other hand, when the decision section 312 decides that processing target data is held neither in the cache memory section 33 nor in the cache device 36 (including a case in which it is decided that, although part of the processing target data is held, the entire processing target data is not held in any of the cache memory section 33 and the cache device 36), the writing processing section 313 acquires at least part of the processing target data from the storage apparatus 20 so that the processing target data is held in the cache memory section 33 or the cache device 36.

In this example of the present embodiment, when it is decided that the processing target data is not held in either of the cache memory section 33 and the cache device 36, the writing processing section 313 outputs a reading instruction including information for specifying a logical sector in which the processing target data is stored (the information for specifying the target sector may be excluded) to the storage apparatus 20. At this time, the writing processing section 313 specifies a segment that includes the target sector and specifies a block of a cache segment length including the specified segment (block specified by the information stored in the storage section 32). It is to be noted that, when the specified segment spans a plurality of blocks, the writing processing section 313 specifies the plurality of blocks.

The writing processing section 313 outputs a reading instruction having information for specifying all the logical sectors included in the specified block of the cache segment length to the storage apparatus 20. Where a plurality of blocks are specified, all the logical sectors included in all of the blocks (which have a data length equal to a natural number of times larger than the cache segment length) are specified, although the target sector may be excluded. Further, the writing processing section 313 stores data including at least the data, which has the length equal to the natural number of times larger than that of the cache segment and is output from the storage apparatus 20 in response to the reading instruction, the data may not include the sector data, in the target sector into the cache device 36. That is, when reading out data to be cached into the cache device 36, the writing processing section 313 reads out the data including at least the data, except the sector data in the target sector, of the length equal to the natural number of times larger than the cache segment length from the storage apparatus 20.

The writing processing section 313 stores the data stored in the cache device 36 as processing target data into the cache memory section 33. Then, the writing processing section 313 performs the operation similar to that performed when it is decided that the processing target data is held in the cache memory section 33.

Further, when the decision section 312 decides that the processing target data is held in the cache device 36, the writing processing section 313 outputs to the storage apparatus 20 either of two types of processing target data: one updated by rewriting it with the data included in the write command and the other updated by additionally writing the data included in the write command. The writing processing section 313 then overwrites the processing target data into the corresponding portion of the cache device 36. Furthermore, at this time, the updated processing target data may be stored also into the cache memory section 33.

It is to be noted that, also in the example described above, part of the processing target data may be held in the cache device 36 (part of the processing target data may be held although the entire processing target data is not held). In such a case the writing processing section 313 may output to the storage apparatus 20 a reading instruction including information for specifying a logical sector corresponding to the portion that is not held in the cache device 36, in place of operating so as to acquire the entire processing target data from the storage apparatus 20.

MODIFICATIONS

It is to be noted that, although the description given above is directed to an example having a configuration that the storage controlling apparatus 30 is provided as a separate member from the host apparatus 10, the embodiment is not limited to this, and the host apparatus 10 and the storage controlling apparatus 30 may be formed as an integrated member. In other words, the host apparatus 10 may function as the storage controlling apparatus 30. In this case, the controller 31 is implemented by a CPU of a PC that is the host apparatus 10, and the storage section 32 and the cache memory section 33 are implemented using a main memory of the PC. In particular, the cache memory section 33 can be implemented by allocating part of the main memory of the host apparatus 10 as a region for the cache memory.

Further, where the host apparatus 10 serves also as the storage controlling apparatus 30 in this manner, the configuration corresponding to the first interface section 34 may not necessarily be provided.

As another example, the storage controlling apparatus 30 may be configured integrally with the storage apparatus 20 (accommodated in a common housing). Where the storage apparatus 20 and the storage controlling apparatus 30 are configured in this manner, the device controller 22 of the storage controlling apparatus 30 may operate also as the controller 31 of the storage controlling apparatus 30. Further, in this example, the configuration corresponding to the second interface section 35 is not necessarily required.

Further, a process in view of units of data read out from and written into the cache memory section 33 (in view of a minimum data length for performing reading out and writing) may be performed irrespective of whether or not the storage controlling system includes the cache device 36. The unit of data read out from and written into the cache memory section 33 is hereinafter referred to as memory cache segment.

In the present example, the controller 31 of the storage controlling apparatus 30 virtually divides the entire data storage region of the storage apparatus 20 (entire logical sectors that can be designated) into blocks of the memory cache segment length. The controller 31 further stores into the storage section 32 a list of pieces of information for specifying the blocks of the memory cache segment length obtained by the division. Each of the pieces of information may be, for example, information for specifying the logical sector corresponding to the top of the respective blocks. The list is referred to as a blocks list corresponding to memory cache segment.

The writing processing section 313 in the present example performs the operation similar to that described hereinabove and performed when the decision section 312 decides that the processing target data is held in the cache memory section 33.

On the other hand, when the decision section 312 decides that the processing target data is not held in the cache memory section 33 (including a case in which it is decided that, although part of the processing target data is held, the entire processing target data is not held in the cache memory section 33), the writing processing section 313 acquires data of at least part of the processing target data from the storage apparatus 20 so that the processing target data is held in the cache memory section 33.

In particular, when it is decided that the processing target data is not held in the cache memory section 33, the writing processing section 313 outputs a reading instruction including information for specifying the logical sectors in which the processing target data is stored (information for specifying the target sector may be excluded) to the storage apparatus 20. At this time, the writing processing section 313 specifies a segment including the target sector and further specifies a block of a data length equal to a natural number of times of the memory cache segment length including the specified segment (specifies at least one block specified by the information included in the blocks list corresponding to memory cache segment, the list being stored in the storage section 32). It is to be noted that, where the specified segment spans a plurality of blocks, the writing processing section 313 specifies the plurality of blocks.

The writing processing section 313 outputs a reading instruction including information for specifying all the logical sectors included in the specified block of a data length equal to the natural number of times larger than the memory cache segment length (where a plurality of blocks are specified, all the logical sectors included in all of the entire blocks, although the target sector may be excluded) to the storage apparatus 20.

The writing processing section 313 stores, from among the data of the length equal to the natural number of times of the memory cache segment length output from the storage apparatus 20 in response to the reading out instruction, data including at least data other than the sector data in the target sector into the cache memory section 33. In short, when the writing processing section 313 reads out data to be cached into the cache memory section 33, the writing processing section 313 reads out, from among the data of the length equal to the natural number of times of the memory cache segment length, data at least including data except the sector data in the target sector from the storage apparatus 20.

There may be a case where the storage controlling system includes the cache device 36, and at the same time, data cached in unit of the memory cache segment length (data length equal to a natural number of times of the memory cache segment length) into the cache memory section 33 is written. In such a case, when data cached into the cache device 36 is read out from the storage apparatus 20, the data may be read out in units of the data length equal to a common multiple of the cache segment length and the memory cache segment length. When the data to be cached into the cache device 36 is read out, the writing processing section 313 reads out data, from the storage apparatus 20, of a length equal to a natural number of times of a least common multiple of the cache segment length and the memory cache segment length.

Dealing with Sequential Write

It is to be noted that, in a certain example of the present embodiment, if a write command input from the host apparatus 10 is of the sequential write type (a writing method in which a writing instruction, or write command, of data into consecutive sectors is input successively), the write command may be processed similarly as in the conventional techniques without performing the process described above for the write command. In short, in the certain example of the present embodiment, the storage controlling apparatus 30 may perform the fraction process described hereinabove only when the write command is not of the sequential write type.

This takes it into consideration that, where the write command is of the sequential write type, at the time data is written into a certain sector, a sector succeeding the certain sector read in for a fraction process is subject to overwriting by the subsequent write command, resulting in less efficient processing.

It is to be noted that whether the write command is of the sequential write type may be decided in the following manner. The controller 31 of the storage controlling apparatus 30 in the present example may, for example, when the write comment is received, extracts information for specifying a sector of a writing target (target sector) specified by information included in the write command (the information generally is a Logical Block Addressing, or LBA, value) and then checks whether the target sector is the subsequent sector of the sector that has been a writing target in one of a predetermined number of operation cycles in the past to decide whether the write command is of the sequential write type.

To this end, in the present example, information for specifying subsequent sectors of each sector that has been a writing target in one of the predetermined number of operation cycles in the past (the information is a value obtained by incrementing the LBA value of each of the sectors that have become a target sector by "1") may be stored as a detection list in the storage section 32.

In this case, when a write command is input, the controller 31 refers to the detection list stored in the storage section 32 to check whether information for specifying a sector of a writing target (target sector) specified by the information included in the write command is included in the detection list. Here, if the information for specifying a target sector is included in the detection list, then the controller 31 decides that the write command is of the sequential access type and executes a writing process similar to that in the conventional example without performing a fraction process.

Further, at this time, the controller 31 updates the information for specifying the target sector included in the detection list to information for specifying the subsequent sector of the target sector.

On the other hand, if it is decided that information for specifying a sector of a writing target (target sector) specified by the information included in the write command input thereto is not included in the detection list, then the controller 31 performs a fraction process and records the information for specifying the subsequent sector of the target sector into the detection list.

It is to be noted that, as the detection list, particularly something that is used for a Least Recently Used (LRU) process for deciding which sector has been recently used may be employed.

The present embodiment can be configured also in the following manner. In particular, the present embodiment is a storage controlling system coupled to a storage apparatus including a plurality of storage disk devices. The storage apparatus receives writing target data, generates a parity in units of parity generation of a given data length for the writing target data, and stores the writing target data and the generated parity into the storage disk devices. The storage controlling system includes a cache memory and a controller. The controller receives a writing instruction including the writing target data and information for specifying a target sector that is a writing destination of the writing target data. Then, the controller decides whether processing target data including, from within data including at least one unit of parity generation that includes sector data in the target sector determined as the writing destination by the received writing instruction and further includes fraction data other than the sector data, a portion other than the sector data is held in the cache memory. The storage controlling system includes a writing processing section configured to update, when it is decided as a result of the decision that the processing target data is held in the cache memory, the processing target data in the cache memory based on the writing instruction and output the processing target data, after its update, as the writing target data to the storage apparatus.

With the configuration of the storage controlling system, data including a natural number (excluding zero) of units of parity generation is output as writing target data to the storage apparatus. This eliminates the need for the storage apparatus to perform Read-Modify-Write-operation at the time of writing data, thus achieving higher speed of the writing process in a write-through operation as well.

The storage controlling system may be configured such that, when the processing target data in the cache memory is updated based on the writing instruction, the writing processing section may rewrite a data part corresponding to the sector data based on the writing instruction if the data part is included in the processing target data in the cache memory. If the data part corresponding to the sector data is not included in the processing target data in the cache memory, however, the writing processing section may refer to the processing target data in the cache memory, specify based on the writing instruction a position to additionally write the data part to, and update the processing target data by additionally writing the data part to the specified position based on the writing instruction.

If the processing target data has not already been held in the cache memory, the writing processing section acquires at least part of the processing target data from the storage apparatus and stores the acquired data into the cache memory so that the processing target data is held in the cache memory.

With the configuration of the writing processing section, data in units of parity generation can be cached with a higher degree of certainty, improving the cache hit rate and thus leading to higher speed of the writing process in a write-through operation.

The storage controlling system may be configured such that it further includes a cache device different from the cache memory, the cache device being configured to cache data stored in the storage apparatus. When it is decided as a result of the decision by the decision section that the processing target data is not held in the cache memory, the writing processing section carries out the following: deciding whether the processing target data is held in the cache memory; reading out the processing target data to the cache memory when the processing target data is held in the cache memory; rewriting the data part based on the writing instruction if the data part corresponding to the sector data is included in the processing target data in the cache memory; and additionally writing the data part based on the writing instruction to update the processing target data and then outputs the processing target data after the update as the writing target data to the storage apparatus, if the data part corresponding to the sector data is not included in the processing target data in the cache memory.

The cache device of the storage controlling system makes it possible to further raise the cache hit rate and thus achieve higher speed of the writing process in a write-through operation.

If the processing target data has not already been held in the cache memory, the writing processing section acquires at least part of the processing target data from the storage apparatus and stores the acquired data into the cache memory and the cashe device so that the processing target data is held in the cache memory and the cashe device.

Further, the storage controlling system may be configured such that, when reading out data from the storage apparatus, the writing processing section reads out the data in units of data length determined in advance for the cache device. Alternatively, the storage controlling system may be configured such that, when outputting writing target data to the storage apparatus, the writing processing section may write the writing target data also into the cache device.

According to another embodiment of the present disclosure, there is provided a storage controlling apparatus coupled to a storage apparatus including a plurality of storage disk devices and accessibly coupled to a cache memory. The storage apparatus receives writing target data, generates a parity in units of parity generation of a given data length for the writing target data, and stores the writing target data and the generated parity into the storage disk devices. The storage controlling apparatus includes: a reception section configured to receive a writing instruction of data including the writing target data and information for specifying a target sector that is a writing destination of the writing target data; a decision section configured to decide whether processing target data including, from within data including at least one unit of parity generation that includes sector data in the target sector determined as the writing destination by the received writing instruction and further includes fraction data other than the sector data, a portion other than the sector data is held in the cache memory; and a writing processing section configured to update, when it is decided as a result of the decision by the decision section that the processing target data is held in the cache memory, the processing target data in the cache memory based on the writing instruction and output the processing target data after the update as the writing target data to the storage apparatus.

According to another embodiment of the present disclosure, the storage controlling apparatus may be configured integrally with a host apparatus that outputs the writing target data to the storage apparatus.

The storage controlling apparatus according to the present embodiment achieves higher speed of the writing process also in a write-through operation.

While a preferred embodiment of the present disclosure has been described using specific terms, such description is for illustrative purposes only, and it is to be understood that changes and variations may be made without departing from the spirit or scope of the following claims.

What is claimed is:

1. A storage controlling system coupled to a storage apparatus including a plurality of storage disk devices, wherein
the storage apparatus receives writing target data, generates a parity of a given data length in units of parity generation for the writing target data, and stores the writing target data and the generated parity into the storage disk devices,
the storage controlling system comprising:
a cache memory; and
a processor configured to
receive a writing instruction including target data and information for specifying a target sector that is a writing destination of the target data;
decide whether fraction data is held in the cache memory, the fraction data being data stored outside of the target sector and being a remaining part of at least one unit of parity generation in which the target sector is located; and
update, when it is decided that the fraction data is held in the cache memory, the cache memory by rewriting the data currently stored in the target sector with the target data of the writing instruction and output the at least one unit of parity generation, after the update, as the writing target data to the storage apparatus.

2. The storage controlling system according to claim 1, wherein, when the cache memory is updated based on the writing instruction,
the processor rewrites a data part corresponding to the data currently stored in the target sector based on the writing instruction if the data part is included in the cache memory, and
the processor refers to the cache memory to specify a position for writing the data part based on the writing instruction, and then updates the cache memory by writing the data part to the specified position based on the writing instruction, if the data part corresponding to the data currently stored in the target sector is not included in the cache memory.

3. The storage controlling system according to claim 1, wherein,
if the fraction data is not held in the cache memory, the processor acquires at least part of the fraction data from the storage apparatus and stores the acquired data into the cache memory.

4. The storage controlling system according to claim 2, wherein, if the fraction data is not held in the cache memory, the processor acquires at least part of the fraction data from the storage apparatus and stores the acquired data into the cache memory.

5. The storage controlling system according to claim 1, further comprising a cache device different from the cache memory and configured to cache data stored in the storage apparatus; wherein
the processor decides whether the fraction data is held in the cache device when it is decided that the fraction data is not held in the cache memory,
the processor reads out the fraction data to the cache memory when the fraction data is held in the cache device,
if a data part corresponding to the data currently stored in the target sector is included in the cache memory, the processor rewrites the data part based on the writing instruction, and
the processor updates the data part based on the writing instruction and then outputs the at least one unit of parity generation, after the update, as the writing target data to the storage apparatus, if the data part corresponding to the data currently stored in the target sector is not included in the cache memory.

6. The storage controlling system according to claim 5, wherein,
if the fraction data is not held in the cache device, the processor acquires at least part of the fraction data from the storage apparatus and stores the acquired data into the cache memory and the cache device.

7. The storage controlling system according to claim 6, wherein,
when reading out data from the storage apparatus, the processor reads out the data in units of a data length determined in advance for the cache device.

8. The storage controlling system according to claim 5, wherein,
when outputting writing target data to the storage apparatus, the processor writes the writing target data also into the cache device.

9. The storage controlling system according to claim 6, wherein,
when outputting writing target data to the storage apparatus, the processor writes the writing target data also into the cache device.

10. The storage controlling system according to claim 7, wherein,
when outputting writing target data to the storage apparatus, the processor writes the writing target data also into the cache device.

11. A storage controlling apparatus coupled to a storage apparatus including a plurality of storage disk devices and coupled to a cache memory, wherein
the storage apparatus receives writing target data, generates a parity in units of parity generation of a given data length for the writing target data, and stores the writing target data and the generated parity into the storage disk devices,
the storage controlling apparatus comprising a processor configured to
receive a writing instruction of data including target data and information for specifying a target sector that is a writing destination of the target data;
decide whether fraction data is held in the cache memory, the fraction data being data stored outside of the target sector and being a remaining part of at least one unit of parity generation in which the target sector is located; and update, when it is decided that the fraction data is held in the cache memory, the cache memory by rewriting the data currently stored in the target sector with the target data of the writing instruction and output the at least one unit of parity generation after the update as the writing target data to the storage apparatus.

12. The storage controlling apparatus according to claim 11, wherein the storage controlling apparatus is configured integrally with a host apparatus that outputs data to write to the storage apparatus.

13. The storage controlling apparatus according to claim 11, wherein the storage controlling apparatus is configured integrally with the storage apparatus.

* * * * *